US010670558B2

(12) United States Patent
Anderson et al.

(10) Patent No.: US 10,670,558 B2
(45) Date of Patent: Jun. 2, 2020

(54) MEMBRANE WASHING APPARATUS

(71) Applicant: Regents of the University of Minnesota, Minneapolis, MN (US)

(72) Inventors: Brett Anderson, Saint Paul, MN (US); Reuben Harris, Saint Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 284 days.

(21) Appl. No.: 15/474,652

(22) Filed: Mar. 30, 2017

(65) Prior Publication Data

US 2017/0292931 A1    Oct. 12, 2017

Related U.S. Application Data

(60) Provisional application No. 62/319,016, filed on Apr. 6, 2016.

(51) Int. Cl.
| | |
|---|---|
| *G01N 35/10* | (2006.01) |
| *G01N 27/447* | (2006.01) |
| *B08B 3/04* | (2006.01) |
| *B01D 41/04* | (2006.01) |

(52) U.S. Cl.
CPC ....... *G01N 27/44704* (2013.01); *B01D 41/04* (2013.01); *B08B 3/044* (2013.01); *G01N 27/44739* (2013.01)

(58) Field of Classification Search
CPC .................................................. G01N 35/1004
See application file for complete search history.

(56) References Cited

U.S. PATENT DOCUMENTS

| | | | | |
|---|---|---|---|---|
| 3,174,492 A | * | 3/1965 | Di Gregorio | ........... B08B 3/044 |
| | | | | 134/104.3 |
| 3,420,372 A | * | 1/1969 | Wash | ...................... B01L 99/00 |
| | | | | 209/269 |
| 2008/0071193 A1 | * | 3/2008 | Reuber | .............. A61B 10/0275 |
| | | | | 600/567 |

OTHER PUBLICATIONS

"Operator's Manual," Blot Washer, Stovall, accessed from www.slscience.com, Apr. 2, 2010, 40 pp.

(Continued)

*Primary Examiner* — Jason Y Ko
(74) *Attorney, Agent, or Firm* — Shumaker & Sieffert, P.A.

(57) ABSTRACT

The present disclosure describes an apparatus including a waste compartment, a membrane compartment on the waste compartment, and a wash buffer reservoir on the membrane compartment. The membrane compartment includes a membrane compartment outlet aperture and is configured to hold at least one membrane, and the membrane compartment outlet aperture fluidly connects the membrane compartment and the waste compartment. The wash buffer reservoir comprises a wash buffer reservoir outlet aperture, and the wash buffer reservoir outlet aperture fluidly connects the wash buffer reservoir and the membrane compartment. The apparatus may be used to wash membranes used in analytic techniques, such as membranes for gel electrophoresis.

20 Claims, 3 Drawing Sheets

(56) References Cited

OTHER PUBLICATIONS

"Multiple Slides, Multiple Blots, Multiple Conditions," SNAP i.d. 2.0 Protein Detection System, Life Science Research, EMD Millipore Corporation, accessed from http://www.emdmillipore.com/US/en/life-science-research/protein-detection-quantification/SNAP-i.d.-2.0-Protein-Detection-System on Jul. 6, 2017, 2 pp.

"SNAP i.d. 2.0 system for Western blotting and IHC," EMD Millipore Corporation, Mar. 2015, 8 pp.

"The Blot Washer," IBI Scientific, accessed from https:llwww.ibisci.com/produc:ts/lhe-blot-washer-115v?variant=24268452229#sthash.I2eHW8HO.dpbs on Jun. 29, 2017, 3 pp.

* cited by examiner

MEMBRANE WASHING APPARATUS

This application claims the benefit of U.S. Provisional Patent Application No. 62/319,016, filed Apr. 6, 2016, entitled, "MEMBRANE WASHING APPARATUS," the contents of which are incorporated herein by reference in their entirety.

GOVERNMENT INTEREST

This invention was made with government support under AI064046 and GM091743 awarded by the National Institutes of Health. The government has certain rights in the invention.

TECHNICAL FIELD

The disclosure relates to a membrane washing apparatus.

BACKGROUND

Membranes may be used in many analytical techniques, for example, for visualizing the separation of proteins, nucleic acids, or the like. One example is western blot (or protein immunoblot), in which a membrane is used to capture, immobilize, and visualize proteins after physical separation of the proteins by gel electrophoresis.

SUMMARY

In some examples, the disclosure describes an apparatus including a waste compartment, a membrane compartment on the waste compartment, and a wash buffer reservoir on the membrane compartment. The membrane compartment includes a membrane compartment outlet aperture and is configured to hold at least one membrane, and the membrane compartment outlet aperture fluidly connects the membrane compartment and the waste compartment. The wash buffer reservoir is configured to contain wash buffer solution and includes a wash buffer reservoir outlet aperture. The wash buffer reservoir outlet aperture fluidly connects the wash buffer reservoir and the membrane compartment.

In some examples, the disclosure describes a method that includes placing at least one membrane in a membrane compartment; disposing the membrane compartment on a waste compartment; disposing a wash buffer reservoir on the membrane compartment; at least partially filling the wash buffer reservoir with a wash buffer solution; and agitating, with an agitator, the membrane compartment, the waste compartment, and the wash buffer reservoir to cause at least some wash buffer solution in the wash buffer reservoir to flow through a wash buffer reservoir outlet aperture into the membrane compartment to wash the at least one membrane, and to cause at least some wash buffer solution in the membrane compartment to flow through a membrane compartment outlet aperture to the waste compartment.

In some examples, the disclosure describes an apparatus that includes a waste compartment, a membrane compartment on the waste compartment, and a wash buffer reservoir on the membrane compartment. The membrane compartment may be configured to hold at least one membrane. The membrane compartment may include a membrane compartment outlet aperture, which fluidly connects the membrane compartment and the waste compartment. The membrane compartment also may include a means for changing a diameter of the membrane compartment outlet aperture. The wash buffer reservoir may be configured to contain wash buffer solution. The wash buffer reservoir may include a wash buffer reservoir outlet aperture, which fluidly connects the wash buffer reservoir and the membrane compartment. The wash buffer reservoir also may include a means for changing a diameter of the wash buffer reservoir outlet aperture.

The details of one or more examples are set forth in the accompanying drawings and the description below. Other features, objects, and advantages of the disclosure will be apparent from the description and drawings, and from the claims.

DETAILED DESCRIPTION

The present disclosure describes an apparatus and techniques for washing a membrane, such a membrane used in analytical techniques such as dot blots or western blots (immunoblots) following the separation/fractionation of proteins by gel electrophoresis. In many instances, membranes have been washed by hand. This is a time-consuming process that takes a scientist or technician away from doing other tasks. The apparatus and techniques described herein allow automation of at least some portions of the washing techniques, which reduces time spent by the scientist or technician on membrane washing, freeing him or her to do other, more beneficial work.

Figure 1:
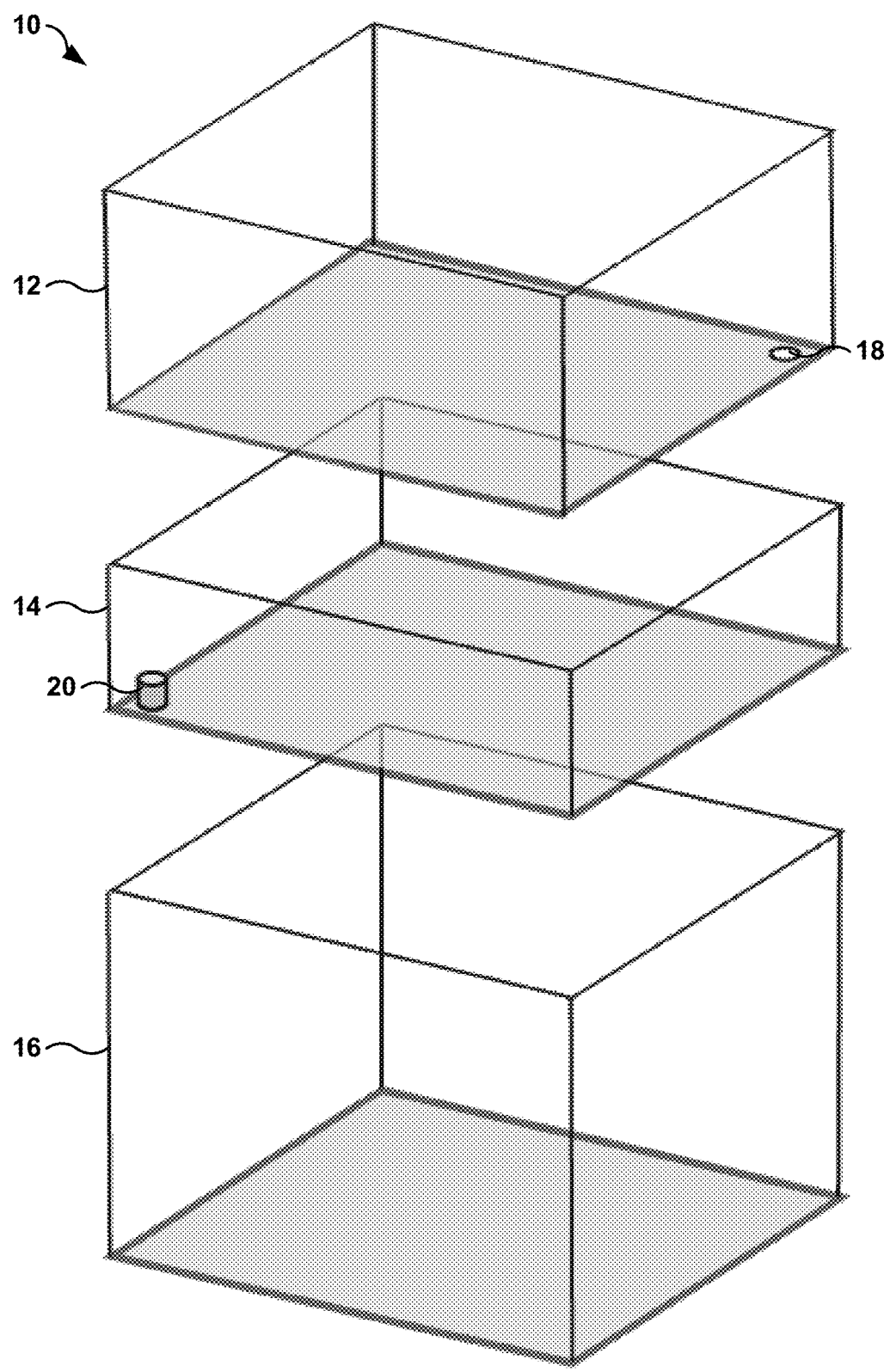
FIG. 1 is a conceptual and schematic exploded view of an example apparatus for washing one or more membranes, in accordance with examples of this disclosure.
Figure 2:
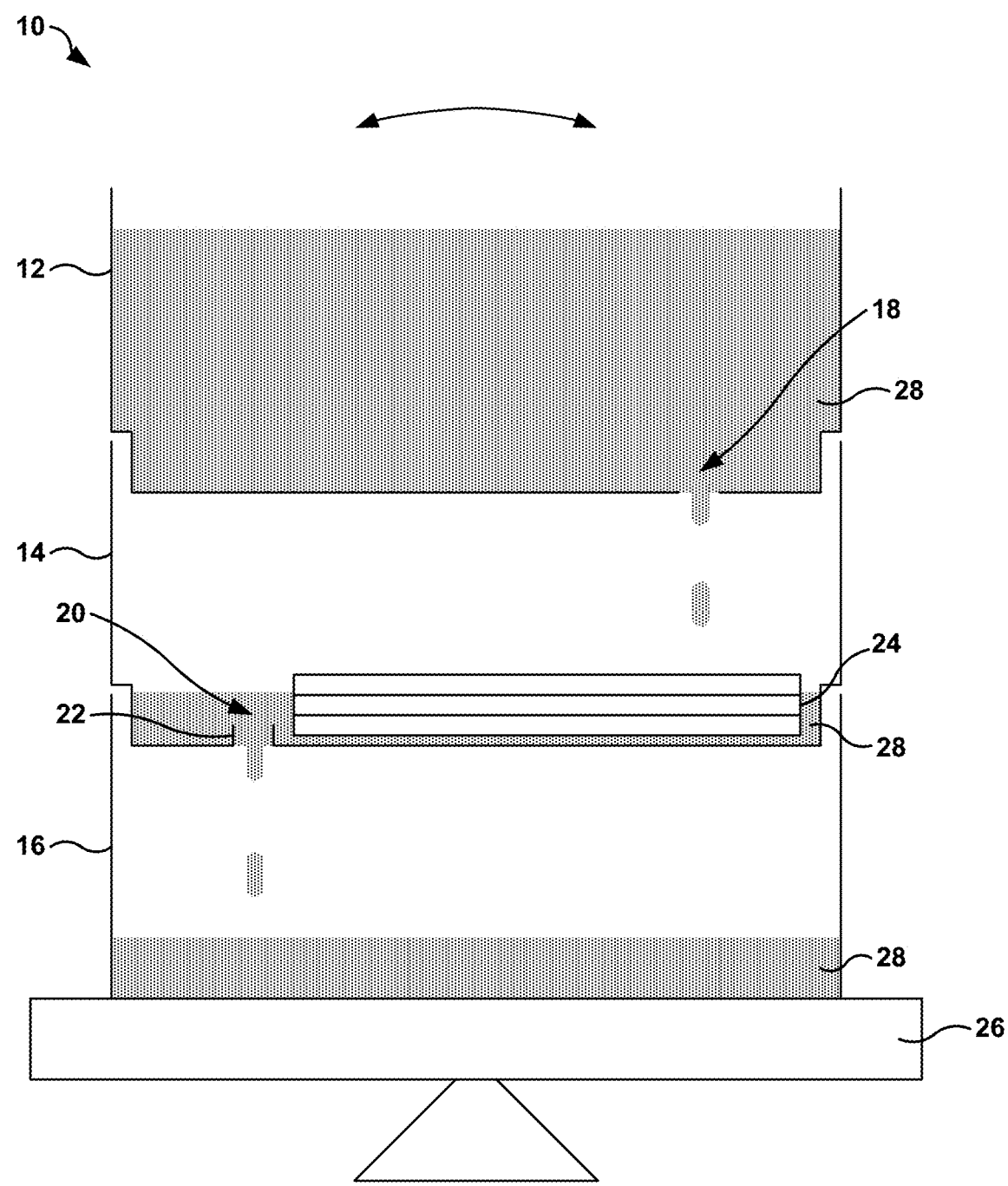
FIG. 2 is a conceptual and schematic block diagram side view of an example apparatus for washing one or more membranes, in accordance with examples of this disclosure.

FIG. 1 is a conceptual and schematic exploded view of an example apparatus 10 for washing one or more membranes, in accordance with examples of this disclosure. FIG. 2 is a conceptual and schematic block diagram side view of apparatus 10.

Apparatus 10 includes a waste compartment 16, a membrane compartment 14, and a wash buffer reservoir 12. Membrane compartment 12 is on waste compartment 16, and wash buffer reservoir 12 is on membrane compartment 14.

Wash buffer reservoir 12 is configured to hold a wash buffer solution 28. Wash buffer solution 28 may include any wash buffer solution 28 useful for washing membranes. In some examples, wash buffer solution 28 may include a solvent or solution and, optionally, a detergent. The solvent or solution may include, for example, saline or buffered saline (e.g., phosphate-buffered saline (PBS); tris-buffered saline (TBS); or the like). In some examples, wash buffer solution 28 may include a detergent to facilitate washing at least one membrane 24, such as, for examples, the polyethylene glycol sorbitan monolaurate detergent available under the trade designation TWEEN® 20 from Sigma-Aldrich® Inc., Saint Louis, Mo.; sodium dodecyl sulfate (SDS); a polyethylene glycol p-(1,1,3,3-tetramethylbutyl)-phenyl ether detergent available under the trade designation Triton™ X-100 from Sigma-Aldrich® Inc., Saint Louis, Mo.; a nonyl phenoxypolyethoxylethanol detergent available under the trade designation Tergitol® type NP-40 from Sigma-Aldrich® Inc., Saint Louis, Mo.; or the like.

In some examples, wash buffer reservoir 12 may be configured (e.g., sized and shaped) to hold substantially all the wash buffer solution 28 used for a washing technique. In other words, wash buffer reservoir 12 may be configured (e.g., sized and shaped) so that all wash buffer solution 28 used for a washing technique may be initially loaded into wash buffer reservoir 12, and additional wash buffer 28 may not need to be refilled into wash buffer reservoir 12 prior to the end of the washing technique. In this way, once the washing technique is started, the person responsible for the washing technique may not need to attend to the apparatus 10 until the washing technique is complete.

In some examples, the washing technique may last for sufficient time to clean at least one membrane 24, for example, between about 15 minutes and about 30 minutes. Thus, a volume of wash buffer solution 28 in wash buffer reservoir 12 may be determined to be at least the flow rate of wash buffer solution 28 through wash buffer reservoir outlet aperture 18 multiplied by the duration of the of the washing technique.

Wash buffer reservoir 12 includes a wash buffer reservoir outlet aperture 18. Wash buffer reservoir outlet aperture 18 fluidically connects wash buffer reservoir 12 and membrane compartment 14, allowing wash buffer solution 28 to flow from wash buffer reservoir 12 to membrane compartment 14. In some examples, a diameter of the wash buffer reservoir outlet aperture 18 is selected to result in a predetermined flow rate of wash buffer solution 28 from wash buffer reservoir 12 to membrane compartment 14. For example, the diameter of wash buffer reservoir 12 may be selected so that wash buffer solution 28 drips, rather than flows continuously, through wash buffer reservoir outlet aperture 18 from wash buffer reservoir 12 to membrane compartment 14. This may reduce a volume of wash buffer solution 28 used during the washing technique.

Apparatus 10 also includes membrane compartment 14. Membrane compartment 14 is configured (e.g., shaped and sized) to hold, contain, or enclose at least one membrane 24. In some examples, membrane compartment 14 includes a platform, stand, or other structure configured to support at least one membrane 24. In some examples, the platform, stand, or other structure also may retain at least one membrane 24 substantially in place relative to membrane compartment 14. In some examples, at least one membrane 24 may include a plurality of membranes, such as at least two membranes. The plurality of membranes may be stacked on each other, disposed at a plurality of respective locations of a platform or stand, or the like.

Membrane compartment 14 includes a membrane compartment outlet aperture 20. In some examples, a diameter of membrane compartment outlet aperture 20 is selected to result in a predetermined flow rate of wash buffer solution 28 from membrane compartment 14 to waste compartment 16. For example, the diameter of membrane compartment outlet aperture 20 may be selected so that wash buffer solution 28 drips, rather than flows continuously, through membrane compartment outlet aperture 20 from membrane compartment 14 to waste compartment 16. This may reduce a volume of wash buffer solution 28 used during the washing technique, as wash buffer solution 28 may remain in membrane compartment 14 for a time before becoming too dirty to be useful for cleaning at least one membrane 24.

In some examples, the diameters of membrane compartment outlet aperture 20 and wash buffer reservoir outlet aperture 18 may be selected such that a flow rate of wash buffer solution 28 from wash buffer reservoir 12 to membrane compartment 14 is substantially the same as (e.g., the same as or nearly the same as) a flow rate of wash buffer solution 28 from membrane compartment 14 to waste compartment 16. This may result in a substantially constant (e.g., constant or nearly constant) amount of wash buffer solution 28 being in membrane compartment 14 when apparatus 10 is at steady state conditions.

In some examples, membrane compartment 14 includes flange 22 surrounding membrane compartment outlet aperture 20. Flange 22 may be configured to retain at least some wash buffer solution 28 in membrane compartment 14 to ensure at least one membrane 24 does not dry out during the washing. In some examples, a height of flange 22 may be selected to be substantially the same as a height of at least one membrane 24 when stacked in membrane compartment 14. In other examples, the height of flange 22 may be selected to be different than a height of at least one membrane 24 when stacked in membrane compartment 14 (e.g., shorter, as shown in FIG. 2). In some examples, the height of flange 22 also may affect a flow rate of wash buffer solution 28 from membrane compartment 14 through membrane compartment outlet aperture 20 to waste compartment 16.

Apparatus 10 also includes waste compartment 16. Waste compartment 16 is configured to receive wash buffer solution 28 from membrane compartment 14. Hence, in some examples, waste compartment 16 is sized to receive substantially all wash buffer solution 28 that is initially deposited into wash buffer reservoir 12.

As shown in FIG. 2, wash buffer reservoir 12 and membrane compartment 14 may define shapes and sizes such that wash buffer reservoir 12 is configured to sit on a top of membrane compartment 14 and at least partially interlock with membrane compartment 14 to reduce or substantially eliminate relative motion between wash buffer reservoir 12 and membrane compartment 14. For example, a circumference of wash buffer reservoir 12 near the bottom of wash buffer reservoir 12 may be stepped to define a ledge, ridge, or protrusion that contacts and cooperate a top circumference of membrane compartment 14. Although not shown in FIG. 1 or 2, in some examples, one or both of wash buffer reservoir 12 and membrane compartment 14 may include a structure that retains or locks wash buffer reservoir 12 relative to membrane compartment 14, such as a tab, screw or bolt, or the like.

Similarly, membrane compartment 14 and waste compartment 16 may define shapes and sizes such that membrane compartment 14 is configured to sit on a top of waste compartment 16 and at least partially interlock with waste compartment 16 to reduce or substantially eliminate relative motion between membrane compartment 14 and waste compartment 16. For example, a circumference of membrane compartment 14 near the bottom of membrane compartment 14 may be stepped to define a ledge, ridge, or protrusion that contacts and cooperate a top circumference of waste compartment 16. Although not shown in FIG. 1 or 2, in some examples, one or both of membrane compartment 14 and wash buffer reservoir 16 may include a structure that retains or locks membrane compartment 14 relative to waste compartment 16, such as a tab, screw or bolt, or the like.

By stacking wash buffer reservoir 12 on membrane compartment 14, and stacking membrane compartment 14 on waste compartment 16, wash buffer reservoir 12, membrane compartment 14, and waste compartment 16 are arranged so that gravity contributes to flow of wash buffer solution 28 from wash buffer reservoir 12 to membrane compartment 14, and from membrane compartment 14 to waste compartment 16.

Each of wash buffer reservoir 12, membrane compartment 14, and waste compartment 16 may be constructed of any suitable material, which does not react with or contaminate at least one membrane 24 or wash buffer solution 28. For example, each of wash buffer reservoir 12, membrane compartment 14, and waste compartment 16 may be formed of a plastic, a metal, or an alloy that withstands detergents and solvents in wash buffer solution 28 and detergents and solvents used to wash apparatus 10 between uses.

The sizes and shapes of wash buffer reservoir 12, membrane compartment 14, and waste compartment 16 may be selected based on the size and shape of at least one membrane 24. In some examples, at least one membrane 24 may define a width or length of between about 2 inches and about 8 inches. Accordingly, a diameter of membrane compartment 14 may be sufficiently large to accommodate at least one membrane 24 and leave membrane compartment outlet aperture 20 uncovered by at least one membrane 24. The sizes and shapes of wash buffer reservoir 12 and waste compartment 16 may be selected so that wash buffer reservoir 12, membrane compartment 14, and waste compartment 16 are stackable as shown in FIG. 2, and so that wash buffer reservoir 12 and waste compartment 16 define sufficient internal volume to hold sufficient wash buffer solution 28 for the washing technique.

In some examples, apparatus 10 optionally may include at least one of means for changing a diameter of membrane compartment outlet aperture 20 to establish a selected flow rate of wash buffer solution 28 through membrane compartment outlet aperture 20, or means for changing a diameter of wash buffer reservoir outlet aperture 18 to establish a selected flow rate of wash buffer solution 28 through wash buffer reservoir outlet aperture 18. The means for changing the diameter may include, for example, a threaded insert that opens and closes the respective aperture when threaded forward or backward, a sliding gate that can increase or decrease the diameter of the respective aperture, or the like. In some examples, one or both of wash buffer reservoir outlet aperture 18 or membrane compartment outlet aperture 20 may include a plurality of apertures. In some examples, the at least one of means for changing a diameter of membrane compartment outlet aperture 20 to establish a selected flow rate of wash buffer solution 28 through membrane compartment outlet aperture 20, or means for changing a diameter of wash buffer reservoir outlet aperture 18 to establish a selected flow rate of wash buffer solution 28 through wash buffer reservoir outlet aperture 18 may include means for selectively obstructing or closing at least one of the plurality of apertures to adjust the flow rate of wash buffer solution 28 through the respective plurality of apertures.

In some example, apparatus 10 may further include an agitator 26. As shown in FIG. 2, waste compartment 16 is on agitator 26. Agitator 26 is configured to agitate wash buffer solution 28 relative to membrane compartment 14. This helps infiltrate wash buffer solution 28 into at least one membrane 24 to wash at least one membrane 24. This also may help cause wash buffer solution 28 to drain through membrane compartment outlet aperture 20. In some examples, agitator 26 includes a platform that is configured to at least one of rock or rotate waste compartment 16, membrane compartment 14, and wash buffer reservoir 12. For example, agitator 26 may include an oscillating rocker that is configured to make a circular oscillating motion. In some examples, agitator 26 is integral with waste compartment 16. In other examples, agitator 26 is separate from waste compartment 16, membrane compartment 14, and wash buffer reservoir 12.

Figure 3:
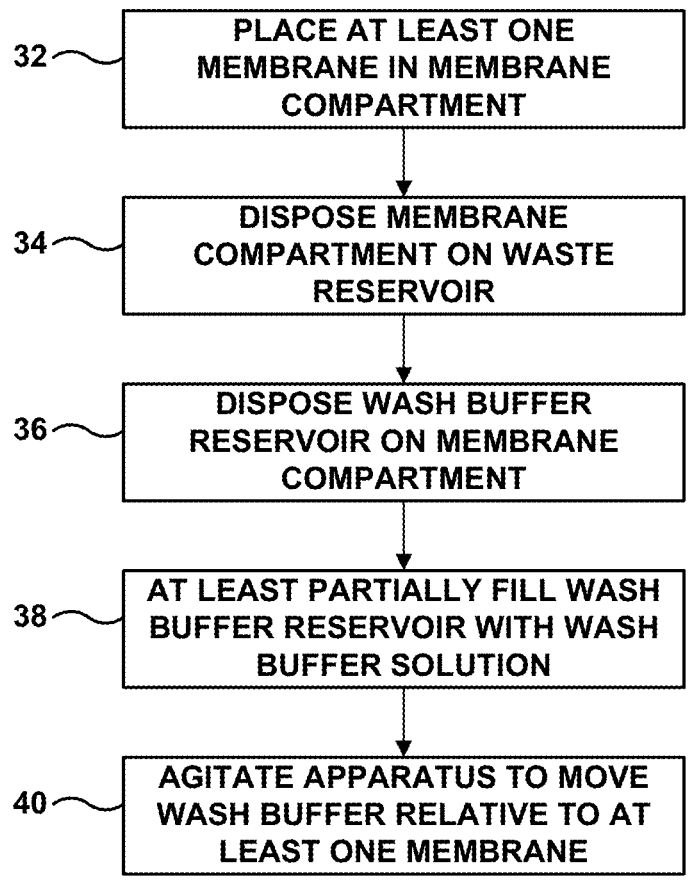
FIG. 3 is a flow diagram illustrating an example technique for washing one or more membranes, in accordance with examples of this disclosure.

FIG. 3 is a flow diagram illustrating an example technique for washing one or more membranes, in accordance with examples of this disclosure. The technique of FIG. 3 will be described with reference to apparatus 10 of FIGS. 1 and 2 for purposes of illustration. In other examples, the technique of FIG. 3 may be performed using other apparatuses, which may include fewer or additional components compared to apparatus 10.

The technique of FIG. 3 includes placing at least one membrane 24 in a membrane compartment 14 (32). In some examples, membrane compartment 14 is configured to hold a plurality of membranes, and placing at least one membrane 24 in a membrane compartment 14 (32) may include placing a plurality of membranes (e.g., at least two) in membrane compartment 14. For example, the plurality of membranes may be stacked within membrane compartment 14.

The technique of FIG. 3 also may include disposing membrane compartment 14 on waste compartment 16 (34). For example, as shown in FIG. 2, membrane compartment 14 and waste compartment may define shapes such that membrane compartment 14 is configured to sit on a top of waste compartment 16 and at least partially interlock with waste compartment 16 to reduce or substantially eliminate relative motion between membrane compartment 14 and waste compartment 16.

The technique of FIG. 3 further may include disposing wash buffer reservoir 12 on membrane compartment 14 (36). Similar to membrane compartment 14 and waste compartment 16, wash buffer reservoir 12 and membrane compartment 14 may define shapes such that wash buffer reservoir 12 is configured to sit on a top of membrane compartment 14 and at least partially interlock with membrane compartment 14 to reduce or substantially eliminate relative motion between wash buffer reservoir 12 and membrane compartment 14.

The technique of FIG. 3 additionally may include at least partially filling wash buffer reservoir 12 with a wash buffer solution 28 (38). Wash buffer solution 28 may include a solvent or solution and, optionally, a detergent. The solvent or solution may include, for example, saline or buffered saline (e.g., phosphate-buffered saline (PBS); tris-buffered saline (TBS); or the like). In some examples, wash buffer solution 28 may include a detergent to facilitate washing at least one membrane 24, such as, for examples, the polyethylene glycol sorbitan monolaurate detergent available under the trade designation TWEEN® 20 from Sigma-Aldrich® Inc., Saint Louis, Mo.; sodium dodecyl sulfate (SDS); a polyethylene glycol p-(1,1,3,3-tetramethylbutyl)-phenyl ether detergent available under the trade designation Triton™ X-100 from Sigma-Aldrich® Inc., Saint Louis, Mo.; a nonyl phenoxypolyethoxylethanol detergent available under the trade designation Tergitol® type NP-40 from Sigma-Aldrich® Inc., Saint Louis, Mo.; or the like.

The technique of FIG. 3 also may include agitating, with agitator 26, membrane compartment 14, waste compartment 16, and wash buffer reservoir 12 to cause at least some wash buffer solution 28 in wash buffer reservoir 12 to flow through wash buffer reservoir outlet aperture 18 into membrane compartment 14 to wash at least one membrane 24, and to cause at least some wash buffer solution 28 in membrane compartment 14 to flow through a membrane compartment outlet aperture 20 to waste compartment 16 (40). In some examples, agitator 26 includes a platform that is configured to at least one of rock or rotate waste compartment 16, membrane compartment 14, and wash buffer reservoir 12. The agitation may facilitate flow of fresh wash buffer solution 28 from wash buffer reservoir 12 to membrane compartment 14, and flow of used wash buffer solution 28 from membrane compartment 14 to waste compartment 16.

In some examples, membrane compartment 14 includes flange 22 surrounding membrane compartment outlet aperture 20. Flange 22 may be configured to retain a wash buffer solution 28 in membrane compartment 14 to ensure at least one membrane 24 does not dry out during the washing. In some examples, a height of flange 22 may be selected to be substantially the same as a height of at least one membrane 24 when stacked in membrane compartment 14. In some examples, the height of flange 22 also may affect a flow rate of wash buffer solution 28 from membrane compartment 14 through membrane compartment outlet aperture 20 to waste compartment 16. In some examples, a diameter of membrane compartment outlet aperture 20 is selected so that wash buffer solution 28 drips, rather than flows continuously, through membrane compartment outlet aperture 20 from membrane compartment 14 to waste compartment 16. This may reduce a volume of wash buffer solution 28 used during the washing technique, as wash buffer solution 28 may remain in membrane compartment 14 for a time before becoming too dirty to be useful for cleaning at least one membrane 24.

Similarly, a diameter of the wash buffer reservoir outlet aperture 18 may be selected so that wash buffer solution 28 drips, rather than flows continuously, through wash buffer reservoir outlet aperture 18 from wash buffer reservoir 12 to membrane compartment 14. This may reduce a volume of wash buffer solution 28 used during the washing technique. In some examples, the diameters of membrane compartment outlet aperture 20 and wash buffer reservoir outlet aperture 18 may be selected such that a flow rate of wash buffer solution 28 from wash buffer reservoir 12 to membrane compartment 14 is substantially the same as (e.g., the same as or nearly the same as) a flow rate of wash buffer solution 28 from membrane compartment 14 to waste compartment 16. This may result in a substantially constant (e.g., constant or nearly constant) amount of wash buffer solution 28 being in membrane compartment 14 when apparatus 10 is at steady state conditions.

In some examples, the technique of FIG. 3 optionally may include at least one of changing a diameter of membrane compartment outlet aperture 20 to establish a selected flow rate of wash buffer solution 28 through membrane compartment outlet aperture 20 or changing a diameter of wash buffer reservoir outlet aperture 18 to establish a selected flow rate of wash buffer solution 28 through wash buffer reservoir outlet aperture 18.

Various examples have been described. These and other examples are within the scope of the following claims.

What is claimed is:

1. An apparatus comprising:
    a waste compartment;
    a membrane compartment on the waste compartment, wherein the membrane compartment comprises a membrane compartment outlet aperture and is configured to hold at least one membrane, and wherein the membrane compartment outlet aperture fluidly connects the membrane compartment and the waste compartment; and
    a wash buffer reservoir on the membrane compartment, wherein the wash buffer reservoir is configured to contain wash buffer solution, wherein the wash buffer reservoir comprises a wash buffer reservoir outlet aperture, wherein the wash buffer reservoir outlet aperture fluidly connects the wash buffer reservoir and the membrane compartment, and wherein the membrane compartment comprises a flange surrounding the outlet aperture, and wherein the flange is configured to retain wash buffer solution in the membrane compartment so the membrane does not dry out during washing.

2. The apparatus of claim 1, wherein the membrane compartment is configured to hold a plurality of membranes.

3. The apparatus of claim 1, wherein a diameter of the wash buffer reservoir outlet aperture is selected to allow wash buffer solution to drip through the wash buffer reservoir outlet aperture from the wash buffer reservoir to the membrane compartment at a predetermined rate.

4. The apparatus of claim 1, wherein a diameter of the membrane compartment outlet aperture is selected to allow fluid to drip through the membrane compartment outlet aperture from the membrane compartment to the waste compartment at a predetermined rate.

5. The apparatus of claim 1, further comprising a means for changing a diameter of the membrane compartment outlet aperture.

6. The apparatus of claim 1, further comprising a means for changing a diameter of the wash buffer reservoir outlet aperture.

7. The apparatus of claim 1, further comprising an agitator, wherein the waste compartment is on the agitator, and wherein the agitator is configured to agitate the wash buffer solution relative to the membrane compartment.

8. The apparatus of claim 7, wherein the agitator comprises a platform that is configured to at least one of rock or rotate the waste compartment, the membrane compartment, and the wash buffer reservoir.

9. The apparatus of claim 7, wherein the agitator is integral with the waste compartment.

10. The apparatus of claim 1, wherein the wash buffer reservoir, the membrane compartment, and the waste compartment are arranged so that gravity contributes to flow of wash buffer solution from the wash buffer reservoir to the membrane compartment, and from the membrane compartment to the waste compartment.

11. A method comprising:
    placing at least one membrane in a membrane compartment;
    disposing the membrane compartment on a waste compartment;
    disposing a wash buffer reservoir on the membrane compartment;
    at least partially filling the wash buffer reservoir with a wash buffer solution; and
    agitating, with an agitator, the membrane compartment, the waste compartment, and the wash buffer reservoir to cause at least some wash buffer solution in the wash buffer reservoir to flow through a wash buffer reservoir outlet aperture into the membrane compartment to wash the at least one membrane, and to cause at least some wash buffer solution in the membrane compartment to flow through a membrane compartment outlet aperture to the waste compartment, and wherein the membrane compartment comprises a flange surrounding the outlet aperture, and wherein the flange is configured to retain wash buffer solution in the membrane compartment so the membrane does not dry out during washing.

12. The method of claim 11, wherein the membrane compartment is configured to hold a plurality of membranes.

13. The method of claim 11, wherein a diameter of the wash buffer reservoir outlet aperture is selected to allow fluid to drip through the wash buffer reservoir outlet aperture from the wash buffer reservoir to the membrane compartment at a predetermined rate.

14. The method of claim 11, wherein a diameter of the membrane compartment outlet aperture is selected to allow fluid to drip through the membrane compartment outlet aperture from the membrane compartment to the waste compartment at a predetermined rate.

15. The method of claim 11, further comprising changing a diameter of the membrane compartment outlet aperture to establish a selected flow rate of wash buffer solution through the membrane compartment outlet aperture.

16. The method of claim 11, further comprising changing a diameter of the wash buffer reservoir outlet aperture to establish a selected flow rate of wash buffer solution through the wash buffer reservoir outlet aperture.

17. The method of claim 11, wherein the agitator comprises a platform that is configured to at least one of rock or rotate the waste compartment, the membrane compartment, and the wash buffer reservoir.

18. An apparatus comprising:
a waste compartment;
a membrane compartment on the waste compartment, wherein the membrane compartment comprises a membrane compartment outlet aperture and is configured to hold at least one membrane, wherein the membrane compartment outlet aperture fluidly connects the membrane compartment and the waste compartment, and wherein the membrane compartment comprises a means for changing a diameter of the membrane compartment outlet aperture; and
a wash buffer reservoir on the membrane compartment, wherein the wash buffer reservoir is configured to contain wash buffer solution, wherein the wash buffer reservoir comprises a wash buffer reservoir outlet aperture, and wherein the wash buffer reservoir outlet aperture fluidly connects the wash buffer reservoir and the membrane compartment, wherein the wash buffer reservoir comprises a means for changing a diameter of the wash buffer reservoir outlet aperture, and wherein the membrane compartment comprises a flange surrounding the outlet aperture, and wherein the flange is configured to retain wash buffer solution in the membrane compartment so the membrane does not dry out during washing.

19. The apparatus of claim 3, wherein the wash buffer reservoir is configured to hold a volume of wash buffer solution sufficient to allow wash buffer solution to flow through the wash buffer reservoir outlet aperture to the membrane compartment at the predetermined rate for a duration of washing of the at least one membrane.

20. The apparatus of claim 4, wherein the wash buffer reservoir is configured to hold a volume of wash buffer solution sufficient to allow wash buffer solution to flow through the membrane compartment outlet aperture to the waste compartment at the predetermined rate for a duration of washing of the at least one membrane.

* * * * *